(12) United States Patent
Liu et al.

(10) Patent No.: US 9,376,537 B2
(45) Date of Patent: *Jun. 28, 2016

(54) PROCESS FOR PREPARING COMPLETELY DELAMINATED GRAPHENE OXIDE/RUBBER NANOCOMPOSITE

(71) Applicant: BEIJING UNIVERSITY OF CHEMICAL TECHNOLOGY, Beijing (CN)

(72) Inventors: Li Liu, Beijing (CN); Yingyan Mao, Beijing (CN); Fazhong Zhang, Beijing (CN); Shipeng Wen, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 110 days.

This patent is subject to a terminal disclaimer.

(21) Appl. No.: 14/318,691

(22) Filed: Jun. 29, 2014

(65) Prior Publication Data

US 2014/0316028 A1  Oct. 23, 2014

Related U.S. Application Data

(63) Continuation-in-part of application No. PCT/CN2012/086495, filed on Dec. 13, 2012.

(30) Foreign Application Priority Data

Dec. 30, 2011  (CN) .......................... 2011 1 0454000

(51) Int. Cl.
| | | |
|---|---|---|
| *C08G 18/08* | (2006.01) | |
| *C08J 3/205* | (2006.01) | |
| *C08K 7/00* | (2006.01) | |
| *C08K 9/02* | (2006.01) | |
| *C08J 3/28* | (2006.01) | |
| *C08K 3/20* | (2006.01) | |
| *C08J 5/00* | (2006.01) | |

(52) U.S. Cl.
CPC ........ *C08J 3/2053* (2013.01); *C08J 3/28* (2013.01); *C08J 5/005* (2013.01); *C08K 3/20* (2013.01); *C08K 7/00* (2013.01); *C08K 9/02* (2013.01); *C08J 2321/02* (2013.01); *C08K 2201/011* (2013.01)

(58) Field of Classification Search
CPC .............. C08J 3/2053; C08J 3/28; C08K 3/20
See application file for complete search history.

(56) References Cited

U.S. PATENT DOCUMENTS

| 2010/0096595 A1* | 4/2010 | Prud'Homme | ........ B82Y 30/00 252/500 |
|---|---|---|---|
| 2014/0309331 A1* | 10/2014 | Liu | .......................... C08L 15/00 523/351 |
| 2014/0323610 A1* | 10/2014 | Liu | .......................... C08K 3/04 523/351 |

* cited by examiner

*Primary Examiner* — Hannah Pak

(74) *Attorney, Agent, or Firm* — Matthias Scholl, PC; Matthias Scholl

(57) ABSTRACT

A process for preparing a completely delaminated graphene oxide/rubber nanocomposite. The process combines emulsion compounding with flocculation or spray drying, retains the morphology of graphene oxide/rubber composite in a liquid state, and achieves highly dispersed and highly delaminated morphology dispersed on nano scale. Furthermore, a substance able to produce ionic bonding or chemical bonding with the surface functional groups of graphene oxide is added to graphene oxide/hydrosol, as a surfactant, thus the interfacial bonding between graphene oxide and the rubber is increased. The composite is subjected to subsequent compounding and vulcanization to prepare a vulcanizate with dynamic performance, such as a high tensile strength, stress at a definite elongation, tearing strength, etc.

7 Claims, 5 Drawing Sheets

PROCESS FOR PREPARING COMPLETELY DELAMINATED GRAPHENE OXIDE/RUBBER NANOCOMPOSITE

CROSS-REFERENCE TO RELATED APPLICATIONS

This application is a continuation-in-part of International Patent Application No. PCT/CN2012/086495 with an international filing date of Dec. 13, 2012, designating the United States, now pending, and further claims priority benefits to Chinese Patent Application No. 201110454000.5 filed Dec. 30, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

This invention relates to a method of preparing a graphene oxide/rubber nanocomposite which has high delamination degree, high dispersion degree, and strong interfacial boding action, particularly to a method of preparing a graphene oxide/rubber nanocomposite contaning a surfactant made by emulsion compounding with flocculation process or by emulsion compounding with spray drying process.

2. Description of the Related Art

In rubber industry, the most widely used fillers are nano sized carbon black and white carbon black. Carbon black is the most important reinforcing fillers for rubber industry. However, as the petroleum resources are running out, carbon black industry which absolutely relies upon petroleum industry is restricted. In addition, the production and application of carbon black cause environment pollution. The reinforcing property of white carbon black to rubber is close to that of carbon black to rubber. However, rubber filled by white carbon black has weaknesses. Particularly, during production, it's hard to mix white carbon black with rubber. Once carbon black does not evenly disperse in rubber, the rubber exhibits low intensity and poor property. Submicron sized and micron sized non-metallic mineral materials are also used as fillers in rubber industry, and the most widely used materials are ceramics and calcium carbonate, dolomite, aedelforsite, talcum, cryolite, pyrophillite, and barite. These fillers are used for the purpose of reducing cost, and do not contribute to the intensity of rubber. Therefore, it is one objective to develop new reinforcing fillers (low consumed, environmental friendly, and free of petroleum resources) to replace conventional fillers and to provide an efficient, convenient, and economic method in rubber industry.

Graphene is a hexagonal flat film of carbon atoms formed by $sp^2$ hybrid orbitals, and is a two dimensional material at a length of one or several carbon atoms. In 2004, Novoselov and Geim from the University of Manchester prepared self-existent two dimensional graphene crystals for the first time by using a tape to delaminate highly oriented graphite. Since graphene has infinite periodically repeated structures in a flat surface and has a nano sized length in a direction perpendicular to the flat surface, graphene can be regarded as a nano material having a macro size. Graphene has a high specific area in theory (about 2630 $m^2/g$), large aspect ratio (>1000), and excellent mechanical strength (Young's modulus of graphene is 1060 GPa). Therefore, graphene exhibits potential advantages for efficient reinforcement of polymer materials.

Structurally complete graphene has high chemical stability. The surface of structurally complete graphene is inert, and the interactions between structurally complete graphene and other medium (such as a solvent) are weak. Van Der Waals force between different sheets of graphene is strong, and thus, graphene powders are prone to aggregate and are hard to dissolve in water or common organic solvents. This causes great difficulties for preparing graphene/polymer composites. Reducing graphite oxide is the mostly widely used method for preparing graphene. Graphite oxide is an intermediate during the process of reducing graphite oxide to produce graphene. Graphite oxide is completely delaminated and changes into graphene oxide by a process of dispersing graphite oxide in water or organic solvent and further processing graphite oxide by ultrasonic waves. There are many oxygen functional groups on the surface of graphene oxide so that graphene oxide is compatible with water and common organic solvents, Van Der Waals force between different sheets of graphene oxide is weakened, and aggregation degree is reduced. Until now, graphene oxide has been used as a reinforcing filler and has been successfully dispersed into polymers having hard plastic substrate (such as polyvinyl acetate, polymethyl methacrylate, and polycaprolactone). (Xu, Y.; Hong, W; Bai, H.; Li, C.; Shi, G Carbon 2009, 47, 3538-3543. Liang, J.; Huang, Y.; Zhang, L.; Wang, Y.; Ma, Y.; Guo, T.; Chen, Y. Adv, Funct. Mater. 2009, 19, 2297-2302. Jang, J. Y.; Kim, M. S.; Jeong, H. M.; Shin, C. M. Compos. Sci. Technol. 2009, 69, 186-191. Kai, W.; Hirota, Y.; Hua, L.; Inoue, Y. J. Appl. Polym. Sci. 2008, 107, 1395-1400. Cai, D.; Song, M. Nanotechnology 2009, 20, 315708/1-315708/6). However, it's a pity that advanced preparation technology which efficiently composites graphene oxide and rubber (simple, easy to industrialize, and obtaining a product having good properties) was not reported as yet. The preparation of excellent rubber products relies upon the solution to dispersion of graphene oxide in rubber and interfacial bonding between graphene oxide and rubber.

SUMMARY OF THE INVENTION

In view of the above-described problems, it is one objective of the invention to provide a graphene oxide/rubber nanocomposite which has high delamination degree, high dispersion degree, and strong interfacial boding action. Graphene used in this method is graphene oxide, and does not undergo a reducing process (Reducing Graphene oxide results in the aggregation of graphene and interferes the dispersion of graphene; surface functional groups of reduced graphene greatly reduce, and reduced graphene is not compatible with rubber). In the composite made by this method, graphene oxide is highly delaminated, highly dispersed, and present in nano sizes so that graphene oxide exhibits a reinforcement property. Also, the strong interfacial bonding between graphene oxide and rubber strengthens the rubber. According to testing results, adding graphene oxide to rubber greatly improves the intensity, resistance, and air barrier performance of rubber. Therefore, the composite can be widely used in industrial products including tires, rubber slabs, rubber tapes, and rubber rollers, and in sealing field. In addition, the composite can be widely used as self-repairing material and tear-resistant material because graphene oxide has excellent restorability and crack growth resisting property.

In accordance with one embodiment of the invention, there is provided a method of preparing a graphene oxide/rubber nanocomposite, which has high delamination degree, high dispersion degree, and strong interfacial boding action, by emulsion compounding with flocculation process or by emulsion compounding with spray drying process. The method not only is used for reinforcing rubber and improving air barrier performance of rubber, but also provides basis for preparing highly electricity conducting materials and highly heat conducting materials in the future. The method comprises:

(1) preparing a graphene oxide/water sol: dispersing graphene oxide in deionized water, and treating by ultrasonic waves for 10 min-6 h at a temperature of 0-100° C., at a power of 10-1000 W, and at a frequency of 10-20000 Hz to obtain the graphene oxide/water sol;

(2) pretreating the graphene oxide/water sol: adding a surfactant to the graphene oxide/water sol, treating by ultrasonic waves for 5 min-5 h or stirring for 5 min-5 h at a stirring speed of 50-10000 r/min to obtain a pretreated graphene oxide/water dispersion;

(3) preparing a graphene oxide/rubber compounding emulsion: treating the graphene oxide/water sol or the graphene oxide/water dispersion in addition to a rubber latex by ultrasonic waves for 10 min-6 h, or stirring the graphene oxide/water sol or the graphene oxide/water dispersion in addition to the rubber latex for 10 min-6 h at a stirring speed of 50-10000 r/min, to obtain a stabilized graphene oxide/rubber compounding emulsion;

(4) preparing a graphene oxide/rubber nanocomposite: A) ion flocculation process: adding a flocculant which demulsifies the graphene oxide/rubber compounding emulsion to perform flocculation, dehydrating and drying a flocculate to obtain the graphene oxide/rubber nanocomposite; B) spray drying process: passing the graphene oxide/rubber compounding emulsion through a spray drier to produce small composite liquid drops, and dehydrating the composite liquid drops in a drying medium to obtain the graphene oxide/rubber nanocomposite; or adding a gasified flocculant to the drying medium of the spray drier to simultaneously perform flocculation and dehydration to obtain the graphene oxide/rubber nanocomposite.

The advantages of this invention lie in that graphene oxide is used as the reinforcing fillers. In water, the oxygen functional groups on the surface of graphene oxide are ionized so that the surface of graphene oxide is negatively charged and graphene oxide forms a stable sol because of an electrostatic force. Particularly, graphene oxide is highly delaminated and is highly dispersed into nano sizes. This is the first structural base of this invention. Adding to the graphene oxide/water sol specific compounds, which form ionic bonding or chemical bonding with the surface functional groups of graphene oxide, as surfactants between molecular chains of graphene oxide and rubber to improve the interfacial bonding between graphene oxide and rubber. This is the second structural base of this invention. Mixing the graphene oxide/water sol or the graphene oxide/water dispersion with the rubber latex and treating by ultrasonic waves or stirring. The emulsion particles and graphene oxide sheets interpenetrate each other while separate from each other so that graphene oxide/rubber dispersion which is highly delaminated and highly dispersed is formed in solution. This is the third structural base of this invention.

The advantage of this invention also lies in that utilizing ion flocculation process or spray drying process to prepare the graphene oxide/rubber nanocomposite. The phase behavior of the graphene oxide/rubber compounding emulsion in liquid form is retained by the graphene oxide/rubber nanocomposite obtained in this invention and, thus, the graphene oxide/rubber nanocomposite, which is highly dispersed, highly delaminated, and present in nano sizes, is obtained. This is the technical mechanism of this invention.

In the graphene oxide/rubber nanocomposite, the graphene oxide fillers is 0.1 phr-20 phr (phr is the weight parts of graphene oxide per every hundred weight parts of rubber), and the surfactant is 0.01 phr-100 phr (phr is the weight parts of the surfactant per every hundred weight parts of rubber). The surfactant in this invention has a solid content of 10-80 wt %, and is one or two compounds selected from the group consisting of carboxylic styrene butadiene latex, butadiene-vinylpyridine copylymer latex, carboxylated styrene-butadiene latex, epoxy latex, carboxylic chloroprene rubber latex, carboxylic acrylonitrile styrene butadien rubber latex, and carboxyl polybutadiene; and silane coupling agent, such as amino-propyl-tri-ethoxy silane coupling agent KH550 and γ-(methacryloxypropyl)-tri-methoxy silane coupling agent KH570, and quaternary ammonium salt. The rubber latex is selected from the group consisting of styrene butadiene latex, natural latex, neoprene latex, butyl latex, NBR latex, butadiene latex, ethylene propylene rubber latex, polyisoprene rubber latex, fluorine rubber latex, silica rubber latex, and polyurethane rubber latex which have a solid content of 10-80 wt %. The flocculant is selected from the group consisting of sulphuric acid, hydrochloric acid, calcium chloride, sodium chloride, potassium chloride, sodium sulphate, aluminium sulphate, ferric trichloride, poly aluminium chloride, and poly ferric chloride which have a percentage of 0.1-10 wt % (not otherwise specified, refers to percentage by weight).

Preferably, the solid content of graphene oxide in the graphene oxide/water sol is 0.01-20 wt %.

Preferably, the flocculate is dried at a temperature of ≤300° C.

Preferably, the drying medium in the spray drier is hot air having a temperature of 60-300° C.

A vulcanizate which is obtained by mixing and vulcanizing the graphene oxide/rubber nanocomposite exhibits high tensile strength, tensile strength at definite elongation, and tearing strength. Also, the air barrier performance of the vulcanizate is significantly improved. For instance, in Example 4 of this application, a vulcanizate is made from the graphene oxide/rubber nanocomposite. When graphene oxide in the graphene oxide/rubber nanocomposite is 4 phr, the composite styrene butadiene rubber has a tensile strength of 14.2 MPa (7.1 times that of pure styrene butadiene rubber), a tensile strength at 100% elongation of 3.7 MPa and a tensile strength at 300% elongation of 11.1 MPa respectively (3.7 times and 5.6 times those of pure styrene butadiene rubber respectively), and an air barrier performance of $2.35 \times 10^{-17}$ $m^2$ $s^{-1}$ $Pa^{-1}$ (3/10 of that of pure styrene butadiene rubber; the smaller the value is, the better the air barrier performance is).

The advantages of this invention lie also in simple process, low cost, no environment pollution, and feasibility of large-scale industrialization.

DETAILED DESCRIPTION OF THE EMBODIMENTS

For further illustrating the invention, embodiments detailing a method of preparing a graphene oxide/rubber nanocomposite are described below. It should be noted that the following examples are intended to describe and not to limit the invention.

Contrast 1

Adding a calcium chloride solution having a concentration of 1% to 500 g styrene butadiene latex (the solid content is 20 wt %) to perform flocculation; water washing a styrene butadiene rubber micelle obtained by the flocculation, and dehydrating at 80° C. for 24 h to obtain a styrene butadiene rubber flocculated gel.

Figure 1A:
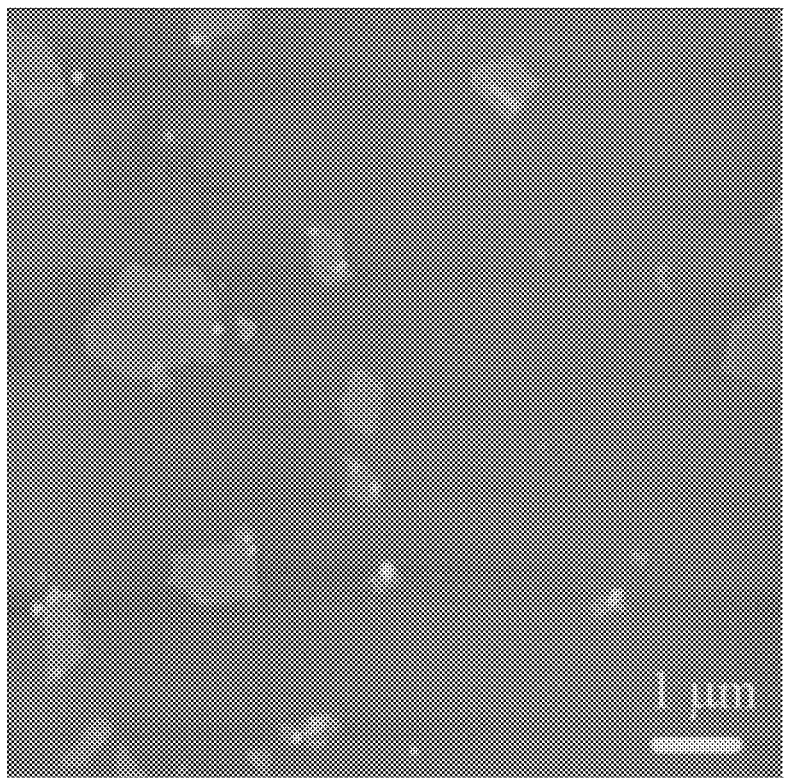
FIGS. 1A and 1B show atom force microscope (AFM) images of a graphene oxide in graphene oxide/water sol. The AFM images show that graphene oxide is present in a single sheet or few sheets and that the traverse scale of graphene oxide is micron sized and the longitudinal scale of graphene oxide is nano sized.
Figure 1B:
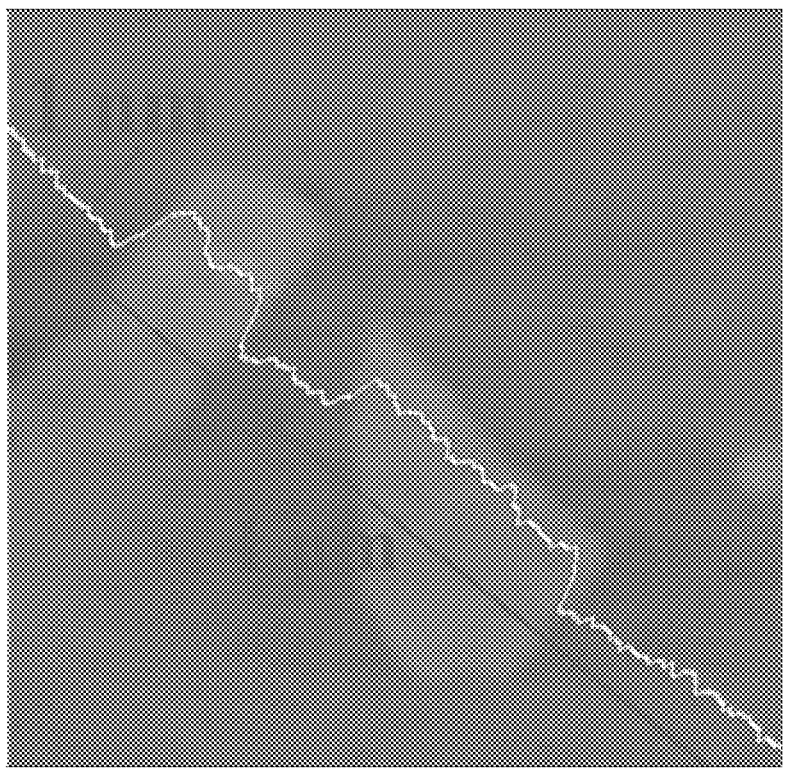
Figure 2A:
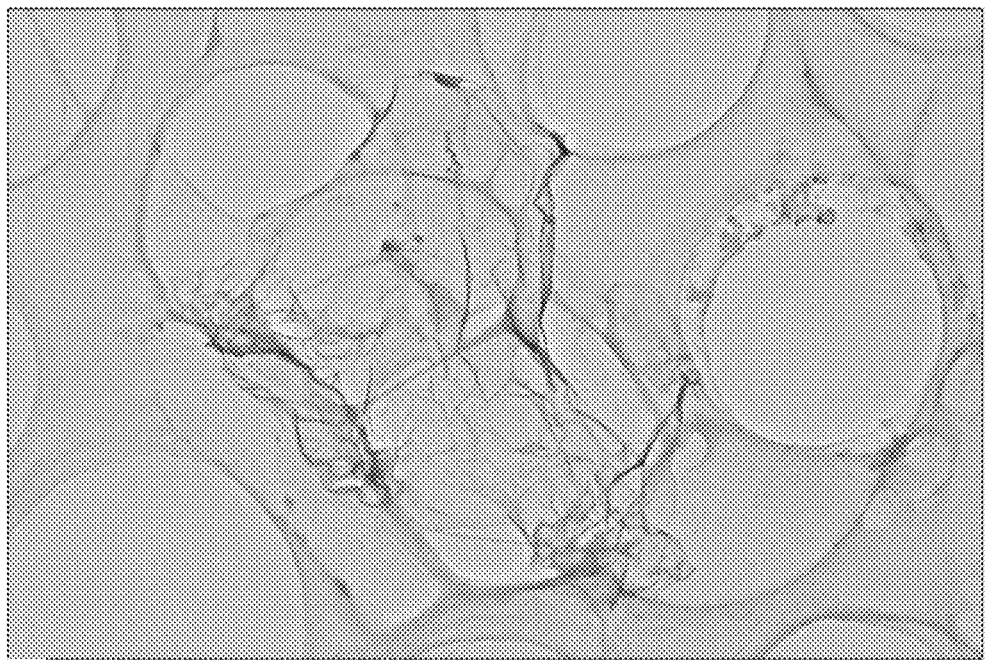
FIGS. 2A and 2B show transmission electron microscope (TEM) images of graphene oxide in a graphene oxide/water sol. The TEM images show that there are obvious folding structures at the edge of graphene oxide.
Figure 2B:
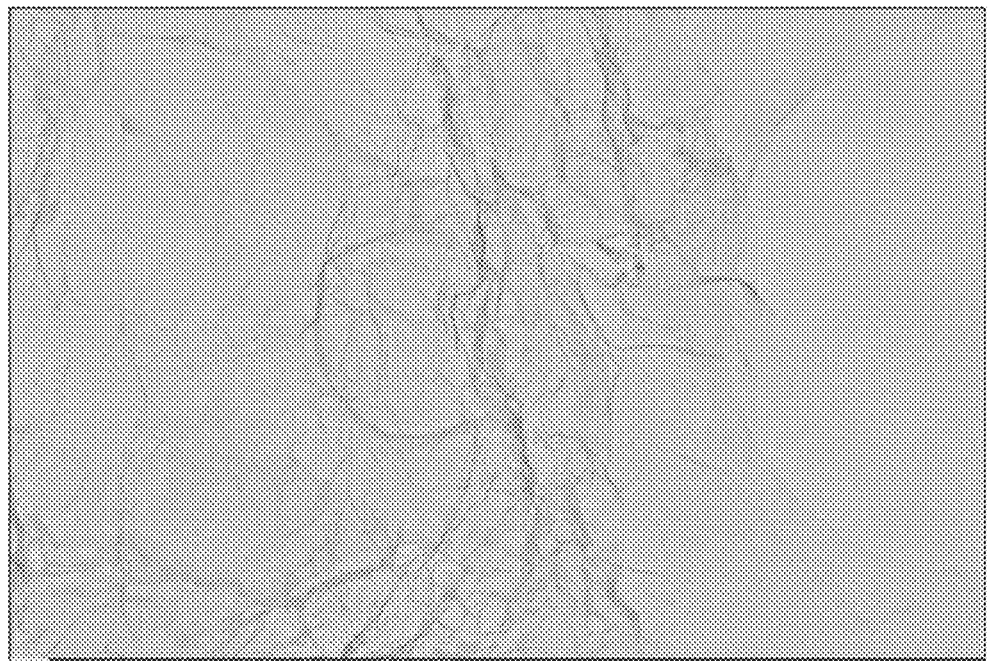
Figure 3A:
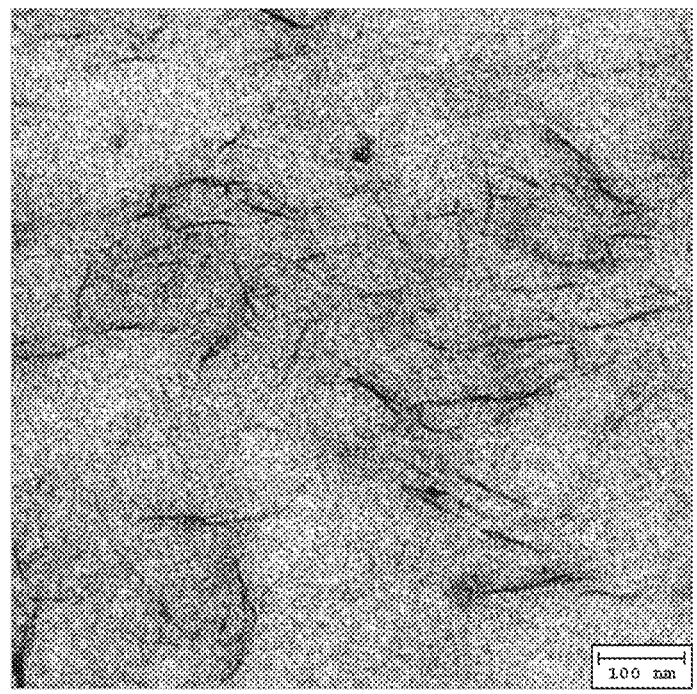
FIGS. 3A and 3B show high resolution transmission electron microscope (HRTEM) images of a graphene oxide/styrene butadiene rubber nanocomposite (Example 4). The HRTEM images show that graphene oxide is evenly dispersed in the styrene butadiene rubber substrate in a form of single sheet.
Figure 3B:
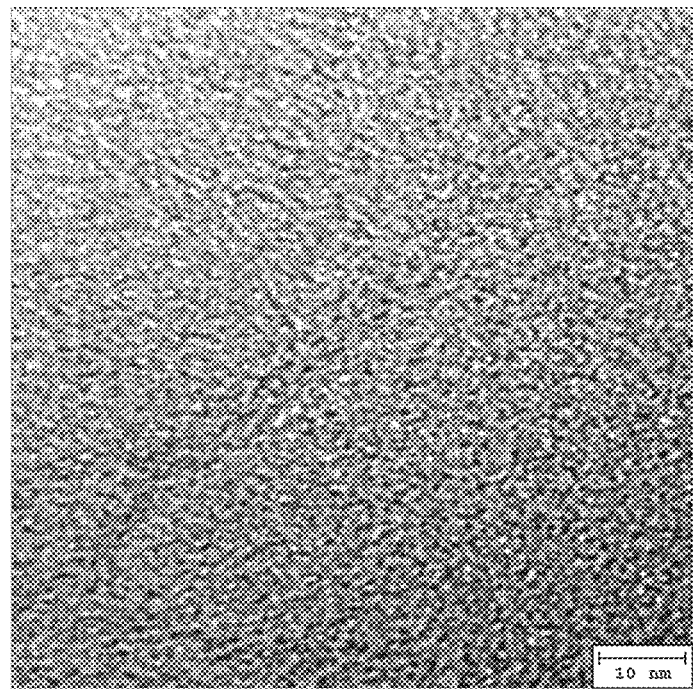
Figure 4:
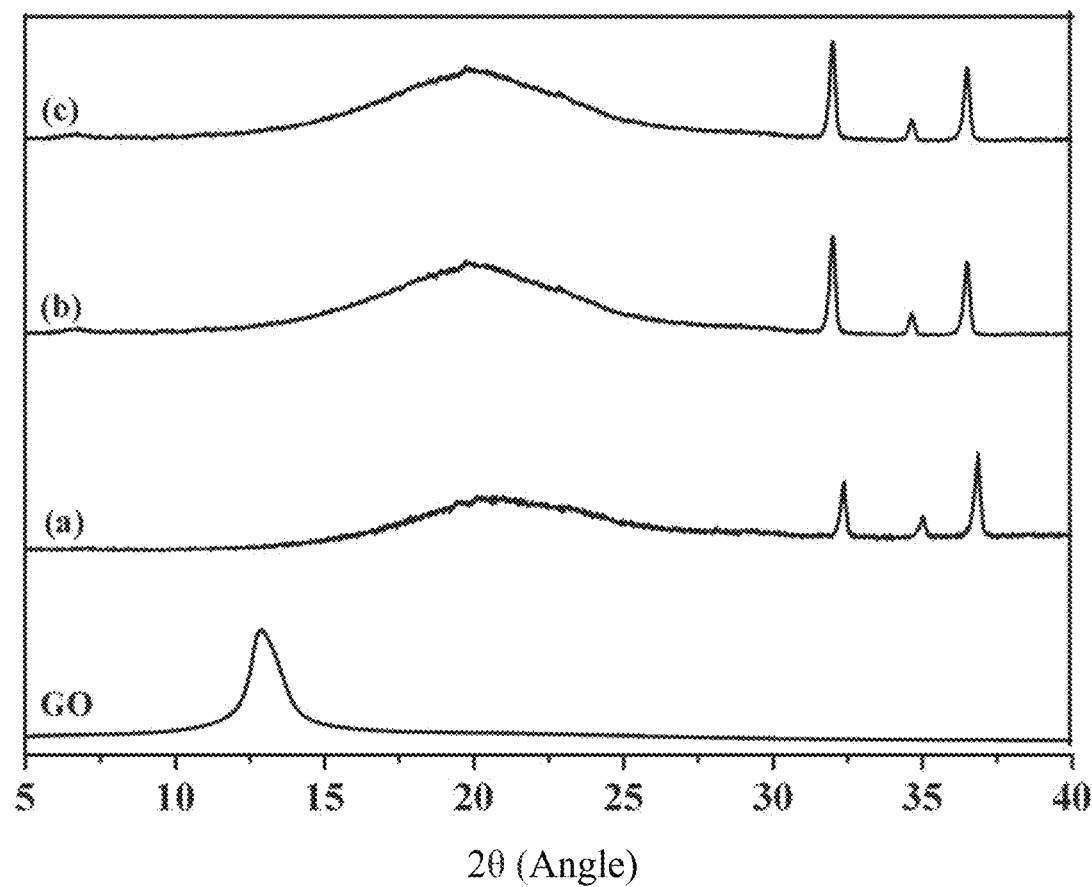
FIG. 4 shows X-ray diffraction profiles of graphite oxide, a styrene butadiene rubber vulcanizate (Contrast 1), and graphene oxide/styrene butadiene rubber vulcanizates (Examples 1 and 9). It is shown that characteristic diffraction peaks of graphene oxide in the graphene oxide/styrene butadiene rubber nanocomposite do not occur. Thus, graphene oxide is present in a form of single sheet and is highly delaminated in the styrene butadiene rubber substrate.
Figure 5A:
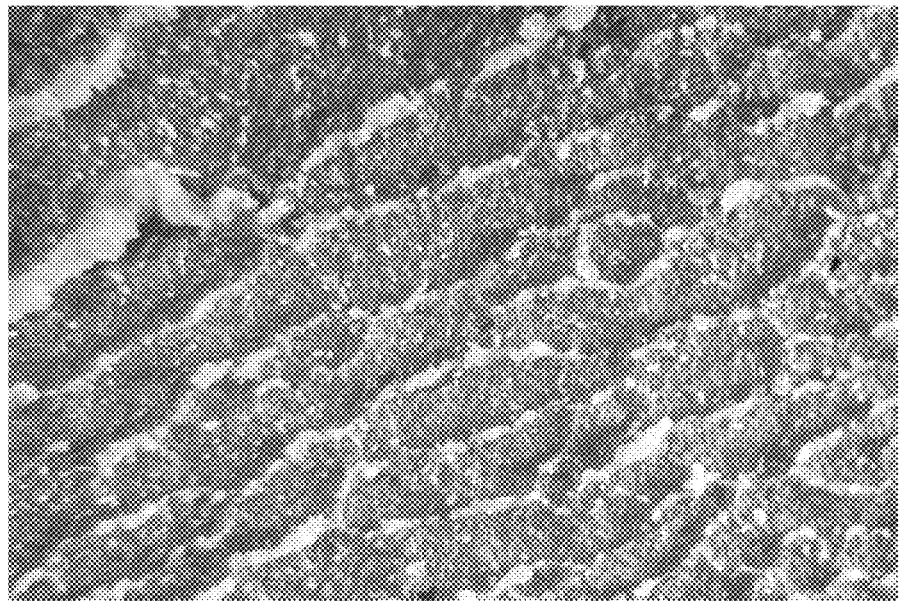
FIG. 5A shows Akron abrasion Schallamach pattern of a graphene oxide/styrene butadiene rubber vulcanizate (Example 10)
Figure 5B:
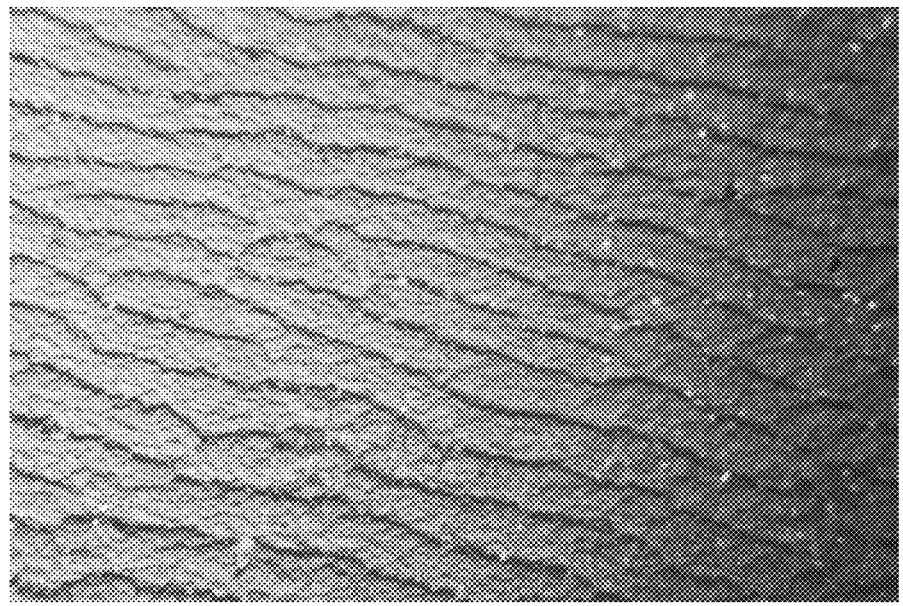
FIG. 5B shows Akron abrasion Schallamach pattern of a white carbon black/styrene butadiene rubber vulcanizate (Contrast 2). It is shown that the Schallamach pattern of the graphene oxide/styrene butadiene rubber vulcanizate is clear and that the rubber substrate and graphene oxide are not massively delaminated. Thus, the interfacial bonding between graphene oxide and the rubber substrate is excellent.

Mixing the styrene butadiene rubber flocculated gel in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a styrene butadiene rubber vulcanizate. Properties of the styrene butadiene rubber vulcanizate are tested according to national standards. Data of mechanical properties of the styrene butadiene rubber vulcanizate are shown in Table 1, and data of air barrier performance of the styrene butadiene rubber vulcanizate is shown in Table 2. X-ray diffraction profiles of the styrene butadiene rubber vulcanizate are shown in curve (a) of FIG. 4.

Example 1

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 100 g of the graphene oxide/water sol with 0.625 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 0.1 phr and the surfactant is 0.25 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2. X-ray diffraction profiles of the vulcanizate are shown in curve (b) of FIG. 4.

Example 2

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 1200 g of the graphene oxide/water sol with 7.5 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 1.2 phr and the surfactant is 3 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 3

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 2000 g of the graphene oxide/water sol with 12.5 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 2 phr and the surfactant is 5 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 4

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 4000 g of the graphene oxide/water sol with 25 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 4 phr and the surfactant is 10 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 5

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 8000 g of the graphene oxide/water sol with 50 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 8 phr and the surfactant is 20 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 6

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 16000 g of the graphene oxide/water sol with 100 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 16 phr and the surfactant is 40 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 7

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 24000 g of the graphene oxide/water sol with 150 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 24 phr and the surfactant is 60 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 8

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 32000 g of the graphene oxide/water sol with 200 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 32 phr and the surfactant is 80 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2.

Example 9

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 40000 g of the graphene oxide/water sol with 250 g butadiene-vinyl pyridine latex (the solid content is 40 wt %) for 10 min at a stirring speed of 500 r/min to obtain a pretreated graphene oxide/water dispersion. Adding 500 g styrene butadiene latex (the solid content is 20 wt %) and further mixing for 20 min at a stirring speed of 500 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 40 phr and the surfactant is 100 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 1, and data of air barrier performance of the vulcanizate is shown in Table 2. X-ray diffraction profiles of the vulcanizate are shown in curve (c) of FIG. 4.

TABLE 1

Mechanical Properties of Graphene Oxide/Styrene Butadiene Rubber Vulcanizate Made by Emulsion Compounding with Flocculation Process

| Sample | Shore Scleroscope Hardness in A scale | Tensile Strength at 100% Elongation/ MPa | Tensile Strength at 300% Elongation/ MPa | Tensile Strength/ MPa | Elongation at Break/% | Tension Set/% | Tearing Strength/ kN/m |
|---|---|---|---|---|---|---|---|
| Contrast 1 | 52 | 1.0 | 2.0 | 2.3 | 339 | 0 | 16.6 |
| Example 1 | 54 | 1.3 | 3.4 | 3.9 | 354 | 0 | 22.5 |
| Example 2 | 60 | 1.7 | 4.8 | 7.3 | 367 | 4 | 35.9 |
| Example 3 | 66 | 2.5 | 7.4 | 9.5 | 388 | 4 | 47.0 |
| Example 4 | 73 | 3.7 | 11.1 | 14.2 | 423 | 8 | 49.7 |
| Example 5 | 77 | 4.7 | 12.5 | 18.9 | 574 | 16 | 53.9 |
| Example 6 | 79 | 4.9 | 12.9 | 24.2 | 690 | 24 | 57.4 |
| Example 7 | 82 | 5.2 | 13.2 | 23.9 | 688 | 20 | 62.8 |
| Example 8 | 88 | 5.4 | 13.4 | 24.7 | 700 | 18 | 65.4 |
| Example 9 | 92 | 5.1 | 12.7 | 24.0 | 696 | 22 | 64.7 |

TABLE 2

Air barrier performance of Graphene Oxide/Styrene Butadiene Rubber Vulcanizate Made by Emulsion Compounding with Flocculation Process

| Sample | Air Barrier Performance/ $10^{-17} m^2 s^{-1} Pa^{-1}$ |
|---|---|
| Contrast 1 | 6.97 |
| Example 1 | 3.02 |
| Example 2 | 2.28 |
| Example 3 | 1.73 |
| Example 4 | 1.42 |
| Example 5 | 1.21 |
| Example 6 | 1.09 |
| Example 7 | 0.92 |
| Example 8 | 0.78 |
| Example 9 | 0.71 |

Contrast 2

Adding a calcium chloride solution having a concentration of 1% to 500 g styrene butadiene latex (the solid content is 20 wt %) to perform flocculation; water washing a styrene butadiene rubber micelle obtained by the flocculation, and dehydrating at 80° C. for 24 h to obtain a styrene butadiene rubber flocculated gel.

Mixing the styrene butadiene rubber flocculated gel in a two roll rubber mixing mill according to a formulation (50 parts by weight of white carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a white carbon black/styrene butadiene rubber vulcanizate. Properties of the vulcanizate are tested according to national standards. Data of mechanical properties of the vulcanizate are shown in Table 3, and Akron abrasion value of the vulcanizate is shown in Table 4.

Example 10

Adding 10 g graphite oxide to 0.1 L water, treating by ultrasonic waves for 4 h at a power of 1000 W, at a frequency of 2000 Hz, and at a temperature of 40° C. to obtain a graphene oxide/water sol having a solid content of 10 wt %. Mixing 100 g of the graphene oxide/water sol with 1 g carboxylic styrene butadiene latex (the solid content is 30 wt %) for 20 min at a stirring speed of 2000 r/min to obtain a pretreated graphene oxide/water dispersion. Adding 500 g styrene butadiene latex (the solid content is 20 wt %) and further mixing for 40 min at a stirring speed of 2000 r/min. Adding calcium chloride solution having a concentration of 1% to perform flocculation. Water washing a graphene oxide/styrene butadiene rubber micelle obtained by the flocculation, and dehydrating at 80° C. for 24 h to obtain a graphene oxide/styrene butadiene rubber nanocomposite in which graphene oxide is 10 phr and the surfactant is 0.3 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 3, and Akron abrasion value of the vulcanizate is shown in Table 4.

Contrast 3

Adding a dilute sulphuric acid solution having a concentration of 10% to 167 g natural latex (the solid content is 60 wt %) to perform flocculation; water washing a styrene butadiene rubber micelle obtained by the flocculation, and dehydrating at 50° C. for 36 h to obtain a natural rubber flocculated gel.

Mixing the natural rubber flocculated gel in a two roll rubber mixing mill according to a formulation (50 parts by weight of white carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 143° C. during the optimum cure to obtain a white carbon black/natural rubber vulcanizate. Properties of the vulcanizate are tested according to national standards. Data of mechanical properties of the vulcanizate are shown in Table 3, and Akron abrasion value of the vulcanizate is shown in Table 4.

Example 11

Adding 5 g graphite oxide to 1 L water, treating by ultrasonic waves for 1 h at a power of 1000 W, at a frequency of 1000 Hz, and at a temperature of 100° C. to obtain a graphene oxide/water sol having a solid content of 0.5 wt %. Mixing 2000 g of the graphene oxide/water sol with 10 g natural epoxy latex (the solid content is 42 wt %) for 30 min at a stirring speed of 1000 r/min to obtain a pretreated graphene oxide/water dispersion. Adding 167 g natural epoxy latex (the solid content is 60 wt %) and further mixing for 30 min at a stirring speed of 1000 r/min. Adding dilute sulphuric acid solution having a concentration of 10% to perform flocculation. Water washing a graphene oxide/natural rubber micelle obtained by the flocculation, and dehydrating at 50° C. for 36 h to obtain a graphene oxide/natural rubber nanocomposite in which graphene oxide is 10 phr and the surfactant is 4.2 phr.

Mixing the graphene oxide/natural rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 143° C. during the optimum cure to obtain a graphene oxide/natural rubber vulcanizate. Properties of the vulcanizate are tested according to national standards. Data of mechanical properties of the vulcanizate are shown in Table 3, and Akron abrasion value of the vulcanizate is shown in Table 4.

Contrast 4

Mixing 350 g styrene butadiene latex (the solid content is 20 wt %) with 50 g butadiene latex (the solid content is 40 wt %) and stirring. Adding a calcium sulphate solution having a concentration of 6% to perform flocculation; water washing a styrene butadiene rubber/butadiene rubber micelle obtained by the flocculation, and dehydrating at 200° C. for 1 h to obtain a styrene butadiene rubber/butadiene rubber flocculated gel.

Mixing the styrene butadiene rubber/butadiene rubber flocculated gel in a two roll rubber mixing mill according to a formulation (50 parts by weight of white carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a styrene butadiene rubber/butadiene rubber vulcanizate. Properties of the vulcanizate are tested according to national standards. Data of mechanical properties of the vulcanizate are shown in Table 3, and Akron abrasion value of the vulcanizate is shown in Table 4.

Example 12

Adding 10 g graphite oxide to 10 L water, treating by ultrasonic waves for 3 h at a power of 600 W, at a frequency of 500 Hz, and at a temperature of 30° C. to obtain a graphene oxide/water sol having a solid content of 0.1 wt %. Mixing 10000 g of the graphene oxide/water sol with 10 g butadiene-vinylpyridine latex (the solid content is 40 wt %) for 30 min at a stirring speed of 1000 r/min to obtain a pretreated graphene oxide/water dispersion. Adding 350 g styrene butadiene latex (the solid content is 20 wt %) and 50 g butadiene latex (the solid content is 40 wt %), and further mixing for 3 h at a stirring speed of 1000 r/min. Adding calcium sulphate solution having a concentration of 6% to perform flocculation. Water washing a graphene oxide/styrene butadiene rubber/butadiene rubber micelle obtained by the flocculation, and dehydrating at 200° C. for 1 h to obtain a graphene oxide/styrene butadiene rubber/butadiene rubber nanocomposite in which graphene oxide is 10 phr and the surfactant is 4 phr.

Mixing the graphene oxide/styrene butadiene rubber/butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber/butadiene rubber vulcanizate. Properties of the vulcanizate are tested according to national standards. Data of mechanical properties of the vulcanizate are shown in Table 3, and Akron abrasion value of the vulcanizate is shown in Table 4.

Contrast 5

Mixing 117 g natural latex (the solid content is 60 wt %) with 54.5 g ethylene propylene latex (the solid content is 55 wt %) and stirring. Adding a calcium sulphate solution having a concentration of 1% to perform flocculation; water washing a natural rubber/ethylene propylene rubber micelle obtained by the flocculation, and dehydrating at 70° C. for 24 h to obtain a natural rubber/ethylene propylene rubber flocculated gel.

Mixing the natural rubber/ethylene propylene rubber flocculated gel in a two roll rubber mixing mill according to a formulation (50 parts by weight of white carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 145° C. during the optimum cure to obtain a natural rubber/ethylene propylene rubber vulcanizate. Properties of the vulcanizate are tested according to national standards. Data of mechanical properties of the vulcanizate are shown in Table 3, and Akron abrasion value of the vulcanizate is shown in Table 4.

Example 13

Adding 10 g graphite oxide to 1 L water, treating by ultrasonic waves for 3 h at a power of 600 W, at a frequency of 500 Hz, and at a temperature of 30° C. to obtain a graphene oxide/water sol having a solid content of 1 wt %. Mixing 1000 g of the graphene oxide/water sol with 1 g butadiene-vinylpyridine latex (the solid content is 40 wt %) for 30 min at a stirring speed of 1000 r/min to obtain a pretreated graphene oxide/water dispersion. Adding 117 g natural latex (the solid content is 60 wt %) and 54.5 g ethylene propylene latex (the solid content is 55 wt %), and further mixing for 3 h at a stirring speed of 1000 r/min. Adding calcium sulphate solution having a concentration of 1% to perform flocculation. Water washing a graphene oxide/natural rubber/ethylene propylene rubber micelle obtained by the flocculation, and dehydrating at 70° C. for 24 h to obtain a graphene oxide/natural rubber/ethylene propylene rubber nanocomposite in which graphene oxide is 10 phr and the surfactant is 0.4 phr.

Mixing the graphene oxide/natural rubber/ethylene propylene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 145° C. during the optimum cure to obtain a graphene oxide/natural rubber/ethylene propylene rubber vulcanizate. Properties of the vulcanizate are tested according to national standards. Data of mechanical properties of the vulcanizate are shown in Table 3, and Akron abrasion value of the vulcanizate is shown in Table 4.

Contrast 6

Adding a dilute hydrochloric acid solution having a concentration of 1% to 357 g acrylonitrile butadiene latex (the solid content is 28 wt %) to perform flocculation; water washing an acrylonitrile butadiene rubber micelle obtained by the flocculation, and dehydrating at 300° C. for 1 h to obtain an acrylonitrile butadiene rubber flocculated gel.

Mixing the acrylonitrile butadiene rubber flocculated gel in a two roll rubber mixing mill according to a formulation (50 parts by weight of white carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 160° C. during the optimum cure to obtain a acrylonitrile butadiene rubber vulcanizate. Properties of the acrylonitrile butadiene rubber vulcanizate are tested according to national standards. Data of mechanical properties of the acrylonitrile butadiene rubber vulcanizate are shown in Table 3, and Akron abrasion value of the acrylonitrile butadiene rubber vulcanizate is shown in Table 4.

Example 14

Adding 10 g graphite oxide to 1 L water, treating by ultrasonic waves for 1 h at a power of 1000 W, at a frequency of 1000 Hz, and at a temperature of 100° C. to obtain a graphene oxide/water sol having a solid content of 1 wt %. Mixing 1000 g of the graphene oxide/water sol with 1 g carboxylic acrylonitrile butadiene latex (the solid content is 20 wt %) for 30 min at a stirring speed of 1000 r/min to obtain a pretreated graphene oxide/water dispersion. Adding 357 g acrylonitrile butadiene latex (the solid content is 28 wt %) and further mixing for 1 h at a stirring speed of 1000 r/min. Adding a calcium chloride solution having a concentration of 1% to perform flocculation. Water washing a graphene oxide/acrylonitrile butadiene rubber micelle obtained by the flocculation, and dehydrating at 300° C. for 1 h to obtain a graphene oxide/acrylonitrile butadiene rubber nanocomposite in which graphene oxide is 10 phr and the surfactant is 0.2 phr.

Mixing the graphene oxide/acrylonitrile butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 160° C. during the optimum cure to obtain a graphene oxide/acrylonitrile butadiene rubber vulcanizate. Properties of the vulcanizate are tested according to national standards. Data of mechanical properties of the vulcanizate are shown in Table 3, and Akron abrasion value of the vulcanizate is shown in Table 4.

TABLE 3

Comparison between Mechanical Properties of Rubber Filled by Graphene Oxide and that of Rubber Filled by White Carbon Black

| Sample | Shore Scleroscope Hardness in A scale | Tensile Strength at 100% Elongation/ MPa | Tensile Strength at 300% Elongation/ MPa | Tensile Strength/ MPa | Elongation at Break/% | Tension Set/% | Tearing Strength/ kN/m |
|---|---|---|---|---|---|---|---|
| Contrast 2 | 65 | 1.9 | 6.2 | 18.5 | 557 | 16 | 44.6 |
| Example 10 | 78 | 4.8 | 12.6 | 23.1 | 633 | 20 | 56.3 |
| Contrast 3 | 54 | 1.2 | 4.8 | 23.9 | 638 | 28 | 36.8 |
| Example 11 | 68 | 3.4 | 9.6 | 24.3 | 689 | 28 | 47.5 |
| Contrast 4 | 67 | 2.1 | 6.9 | 19.1 | 534 | 20 | 49.3 |
| Example 12 | 79 | 4.9 | 13.1 | 24.2 | 618 | 16 | 55.7 |
| Contrast 5 | 58 | 1.7 | 5.2 | 22.9 | 723 | 32 | 37.9 |
| Example 13 | 71 | 4.3 | 10.4 | 25.7 | 712 | 20 | 48.3 |
| Contrast 6 | 69 | 2.3 | 8.4 | 17.6 | 469 | 20 | 46.3 |
| Example 14 | 83 | 3.7 | 10.4 | 21.3 | 521 | 24 | 52.8 |

TABLE 4

Comparison between Akron Abrasion Values of Rubber Filled by Graphene Oxide and that of Rubber Filled by White Carbon Black

| Sample | Akron Abrasion Value/ cm$^3$/1.61 km |
|---|---|
| Contrast 2 | 0.29 |
| Example 10 | 0.13 |
| Contrast 3 | 0.21 |
| Example 11 | 0.11 |
| Contrast 4 | 0.27 |
| Example 12 | 0.12 |
| Contrast 5 | 0.25 |
| Example 13 | 0.10 |
| Contrast 6 | 0.14 |
| Example 14 | 0.08 |

Contrast 7

Adding a calcium chloride solution having a concentration of 1% to 500 g styrene butadiene latex (the solid content is 20 wt %) to perform flocculation; water washing a styrene butadiene rubber micelle obtained by the flocculation, and dehydrating at 80° C. for 24 h to obtain a styrene butadiene rubber flocculated gel.

Mixing the styrene butadiene rubber flocculated gel in a two roll rubber mixing mill according to a formulation (40 parts by weight of carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a styrene butadiene rubber vulcanizate. Properties of the styrene butadiene rubber vulcanizate are tested according to national standards. Data of mechanical properties of the styrene butadiene rubber vulcanizate are shown in Table 5, and air barrier performance of the styrene butadiene rubber vulcanizate is shown in Table 6.

Example 15

Adding 20 g graphite oxide to 100 mL water, treating by ultrasonic waves for 5 h at a power of 2000 W, at a frequency of 1000 Hz, and at a temperature of 0° C. to obtain a graphene oxide/water sol having a solid content of 20 wt %. Mixing 25 g of the graphene oxide/water sol with 1 g carboxylic styrene butadiene latex (the solid content is 50 wt %) for 1 h at a power of 2000 W, at a frequency of 20000 Hz, and at a temperature of 0° C. to obtain a pretreated graphene oxide/water dispersion. Adding 500 g styrene butadiene latex (the solid content is 20 wt %) and further mixing for 1 h at a power of 2000 W, at a frequency of 20000 Hz, and at a temperature of 0° C. Adding a calcium chloride solution having a concentration of 1% to perform flocculation. Water washing a graphene oxide/ styrene butadiene rubber micelle obtained by the flocculation, and dehydrating at 80° C. for 24 h to obtain a graphene oxide/styrene butadiene rubber nanocomposite in which graphene oxide is 5 phr and the surfactant is 0.5 phr.

Mixing the graphene oxide/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber vulcanizate. Properties of the vulcanizate are tested according to national standards. Data of mechanical properties of the vulcanizate are shown in Table 5, and air barrier performance of the vulcanizate is shown in Table 6.

Contrast 8

Adding a dilute sulphuric acid solution having a concentration of 10% to 167 g natural latex (the solid content is 60 wt %) to perform flocculation; water washing a styrene butadiene rubber micelle obtained by the flocculation, and dehydrating at 50° C. for 36 h to obtain a natural rubber flocculated gel.

Mixing the natural rubber flocculated gel in a two roll rubber mixing mill according to a formulation (40 parts by weight of carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 143° C. during the optimum cure to obtain a natural rubber vulcanizate. Properties of the natural rubber vulcanizate are tested according to national standards. Data of mechanical properties of the natural rubber vulcanizate are shown in Table 5, and Akron abrasion value of the natural rubber vulcanizate is shown in Table 6.

Example 16

Adding 5 g graphite oxide to 1 L water, treating by ultrasonic waves for 1 h at a power of 1000 W, at a frequency of 1000 Hz, and at a temperature of 100° C. to obtain a graphene oxide/water sol having a solid content of 0.5 wt %. Mixing 1000 g of the graphene oxide/water sol with 10 g natural epoxy latex (the solid content is 42 wt %) for 1 h at a power of 1000 W, at a frequency of 1000 Hz, and at a temperature of 100° C. to obtain a pretreated graphene oxide/water dispersion. Adding 167 g natural epoxy latex (the solid content is 60 wt %) and further mixing for 1 h at a power of 1000 W, at a frequency of 1000 Hz, and at a temperature of 0° C. Adding a dilute sulphuric acid solution having a concentration of 10% to perform flocculation. Water washing a graphene oxide/natural rubber micelle obtained by the flocculation, and dehydrating at 50° C. for 36 h to obtain a graphene oxide/natural rubber nanocomposite in which graphene oxide is 5 phr and the surfactant is 4.2 phr.

Mixing the graphene oxide/natural rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 143° C. during the optimum cure to obtain a graphene oxide/natural rubber vulcanizate. Properties of the vulcanizate are tested according to national standards. Data of mechanical properties of the vulcanizate are shown in Table 5, and air barrier performance of the vulcanizate is shown in Table 6.

Contrast 9

Mixing 117 g natural latex (the solid content is 60 wt %) with 150 g styrene butadiene latex (the solid content is 20 wt %) and stirring. Adding a calcium sulphate solution having a concentration of 6% to perform flocculation; water washing a natural rubber/styrene butadiene rubber micelle obtained by the flocculation, and dehydrating at 40° C. for 60 h to obtain a natural rubber/styrene butadiene rubber flocculated gel.

Mixing the natural rubber/styrene butadiene rubber flocculated gel in a two roll rubber mixing mill according to a formulation (40 parts by weight of carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 145° C. during the optimum cure to obtain a natural rubber/styrene butadiene rubber vulcanizate. Properties of the vulcanizate are tested according to national standards. Data of mechanical properties of the vulcanizate are shown in Table 5, and air barrier performance of the vulcanizate is shown in Table 6.

Example 17

Adding 10 g graphite oxide to 10 L water, treating by ultrasonic waves for 3 h at a power of 600 W, at a frequency of 500 Hz, and at a temperature of 30° C. to obtain a graphene oxide/water sol having a solid content of 0.1 wt %. Mixing 5000 g of the graphene oxide/water sol with 10 g KH550 for 1 h at a power of 600 W, at a frequency of 500 Hz, and at a temperature of 30° C. to obtain a pretreated graphene oxide/water dispersion. Adding 117 g natural latex (the solid content is 60 wt %) and 150 g styrene butadiene latex (the solid content is 20 wt %), and further mixing for 1 h at a power of 600 W, at a frequency of 500 Hz, and at a temperature of 30° C. Adding a calcium sulphate solution having a concentration of 6% to perform flocculation. Water washing a graphene oxide/natural rubber/styrene butadiene rubber micelle obtained by the flocculation, and dehydrating at 40° C. for 60 h to obtain a graphene oxide/natural rubber/styrene butadiene rubber nanocomposite in which graphene oxide is 5 phr and the surfactant is 10 phr.

Mixing the graphene oxide/natural rubber/styrene butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/natural rubber/styrene butadiene rubber vulcanizate. Properties of the vulcanizate are tested according to national standards. Data of mechanical properties of the vulcanizate are shown in Table 5, and air barrier performance of the vulcanizate is shown in Table 6.

Contrast 10

Adding a calcium chloride solution having a concentration of 0.1% to 286 g chloroprene latex (the solid content is 35 wt %) to perform flocculation; water washing a chloroprene rubber micelle obtained by the flocculation, and dehydrating at 200° C. for 2 h to obtain a natural rubber/ethylene propylene rubber flocculated gel.

Mixing the chloroprene rubber flocculated gel in a two roll rubber mixing mill according to a formulation (40 parts by weight of carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 143° C. during the optimum cure to obtain a chloroprene rubber vulcanizate. Properties of the chloroprene rubber vulcanizate are tested according to national standards. Data of mechanical properties of the chloroprene rubber vulcanizate are shown in Table 5, and air barrier performance of the chloroprene rubber vulcanizate is shown in Table 6.

Example 18

Adding 5 g graphite oxide to 50 L water, treating by ultrasonic waves for 10 min at a power of 10 W, at a frequency of 10 Hz, and at a temperature of 25° C. to obtain a graphene oxide/water sol having a solid content of 0.01 wt %. Mixing 50 kg of the graphene oxide/water sol with 10 g carboxylic chloroprene latex (the solid content is 38 wt %) for 10 min at a stirring speed of 10000 r/min to obtain a pretreated graphene oxide/water dispersion. Adding 286 g chloroprene latex (the solid content is 35 wt %) and further mixing for 20 min at a stirring speed of 10000 r/min. Adding a calcium chloride solution having a concentration of 0.1% to perform flocculation. Water washing a graphene oxide/chloroprene rubber micelle obtained by the flocculation, and dehydrating at 200° C. for 2 h to obtain a graphene oxide/natural rubber/chloroprene rubber nanocomposite in which graphene oxide is 5 phr and the surfactant is 3.8 phr.

Mixing the graphene oxide/chloroprene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 143° C. during the optimum cure to obtain a graphene oxide/chloroprene rubber vulcanizate. Properties of the vulcanizate are tested according to national standards. Data of mechanical properties of the vulcanizate are shown in Table 5, and air barrier performance of the vulcanizate is shown in Table 6.

Contrast 11

Adding a sodium sulphate solution having a concentration of 5% to 400 g butyl latex (the solid content is 25 wt %) to perform flocculation; water washing an butyl rubber micelle obtained by the flocculation, and dehydrating at 120° C. for 6 h to obtain a butyl rubber flocculated gel.

Mixing the butyl rubber flocculated gel in a two roll rubber mixing mill according to a formulation (40 parts by weight of carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a butyl rubber vulcanizate. Properties of the butyl rubber vulcanizate are tested according to national standards. Data of mechanical properties of the butyl rubber vulcanizate are shown in Table 5, and air barrier performance of the butyl rubber vulcanizate is shown in Table 6.

Example 19

Adding 10 g graphite oxide to 0.5 L water, treating by ultrasonic waves for 1 h at a power of 200 W, at a frequency of 100 Hz, and at a temperature of 55° C. to obtain a graphene oxide/water sol having a solid content of 2 wt %. Mixing 250 kg of the graphene oxide/water sol with 10 g carboxylic butyl latex (the solid content is 20 wt %) for 1 h at a stirring speed of 900 r/min to obtain a pretreated graphene oxide/water dispersion. Adding 400 g butyl latex (the solid content is 25 wt %) and further mixing for 1 h at a stirring speed of 900 r/min. Adding a sodium sulphate solution having a concentration of 5% to perform flocculation. Water washing a graphene oxide/butyl rubber micelle obtained by the flocculation, and dehydrating at 120° C. for 6 h to obtain a graphene oxide/butyl rubber nanocomposite in which graphene oxide is 5 phr and the surfactant is 2 phr.

Mixing the graphene oxide/butyl rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/butyl rubber vulcanizate. Properties of the vulcanizate are tested according to national standards. Data of mechanical properties of the vulcanizate are shown in Table 5, and air barrier performance of the vulcanizate is shown in Table 6.

Contrast 12

Mixing 350 g styrene butadiene latex (the solid content is 20 wt %) with 50 g butadiene latex (the solid content is 40 wt %) and stirring. Adding a sodium sulphate solution having a concentration of 6% to perform flocculation; water washing a styrene butadiene rubber/butadiene rubber micelle obtained by the flocculation, and dehydrating at 200° C. for 1 h to obtain a styrene butadiene rubber/butadiene rubber flocculated gel.

Mixing the styrene butadiene rubber/butadiene rubber flocculated gel in a two roll rubber mixing mill according to a formulation (40 parts by weight of carbon black, 5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a styrene butadiene rubber/butadiene rubber vulcanizate. Properties of the vulcanizate are tested according to national standards. Data of mechanical properties of the vulcanizate are shown in Table 5, and air barrier performance of the vulcanizate is shown in Table 6.

Example 20

Adding 10 g graphite oxide to 10 L water, treating by ultrasonic waves for 3 h at a power of 600 W, at a frequency of 500 Hz, and at a temperature of 30° C. to obtain a graphene oxide/water sol having a solid content of 0.1 wt %. Mixing 5000 g of the graphene oxide/water sol with 10 g butadiene-vinylpyridine latex (the solid content is 40 wt %) for 30 min at a stirring speed of 1000 r/min to obtain a pretreated graphene oxide/water dispersion. Adding 350 g butadiene-vinylpyridine latex (the solid content is 20 wt %) and 50 g butadiene latex (the solid content is 40 wt %), and further mixing for 3 h at a stirring speed of 1000 r/min. Adding a calcium sulphate solution having a concentration of 6% to perform flocculation. Water washing a graphene oxide/styrene butadiene rubber/butadiene rubber micelle obtained by the flocculation, and dehydrating at 200° C. for 1 h to obtain a graphene oxide/styrene butadiene rubber/butadiene rubber nanocomposite in which graphene oxide is 5 phr and the surfactant is 4 phr.

Mixing the graphene oxide/styrene butadiene rubber/butadiene rubber nanocomposite in a two roll rubber mixing mill according to a formulation (5 parts by weight of zinc oxide, 2 parts by weight of stearic acid, 1.5 parts by weight of accelerator CZ, 0.2 parts by weight of accelerator M, 2 parts by weight of antioxidant 4010NA, and 2.5 parts by weight of sulfur) to obtain a mix gel. Vulcanizing the mix gel at 150° C. during the optimum cure to obtain a graphene oxide/styrene butadiene rubber/butadiene rubber vulcanizate. Properties of the vulcanizate are tested according to national standards. Data of mechanical properties of the vulcanizate are shown in Table 5, and air barrier performance of the vulcanizate is shown in Table 6.

TABLE 5

Comparison between Mechanical Properties of Rubber Filled by Graphene Oxide and that of Rubber Filled by Carbon Black

| Sample | Shore Scleroscope Hardness in A scale | Tensile Strength at 100% Elongation/ MPa | Tensile Strength at 300% Elongation/ MPa | Tensile Strength/ MPa | Elongation at Break/% | Tension Set/% | Tearing Strength/ kN/m |
|---|---|---|---|---|---|---|---|
| Contrast 7 | 67 | 2.1 | 5.9 | 19.5 | 517 | 20 | 46.4 |
| Example 15 | 75 | 4.2 | 11.6 | 17.9 | 610 | 28 | 51.3 |

TABLE 5-continued

Comparison between Mechanical Properties of Rubber Filled by Graphene Oxide and that of Rubber Filled by Carbon Black

| Sample | Shore Scleroscope Hardness in A scale | Tensile Strength at 100% Elongation/ MPa | Tensile Strength at 300% Elongation/ MPa | Tensile Strength/ MPa | Elongation at Break/% | Tension Set/% | Tearing Strength/ kN/m |
|---|---|---|---|---|---|---|---|
| Contrast 8 | 59 | 1.7 | 5.3 | 24.4 | 567 | 28 | 41.8 |
| Example 16 | 65 | 2.5 | 8.7 | 21.6 | 619 | 32 | 42.5 |
| Contrast 9 | 70 | 2.2 | 7.2 | 19.8 | 512 | 20 | 50.3 |
| Example 17 | 72 | 3.2 | 11.3 | 21.2 | 597 | 24 | 51.7 |
| Contrast 10 | 62 | 1.9 | 4.9 | 23.7 | 623 | 28 | 38.3 |
| Example 18 | 66 | 3.4 | 9.6 | 22.7 | 683 | 32 | 41.3 |
| Contrast 11 | 65 | 2.5 | 9.4 | 18.1 | 444 | 20 | 45.5 |
| Example 19 | 72 | 2.7 | 10.0 | 19.2 | 508 | 24 | 47.8 |
| Contrast 12 | 71 | 2.3 | 8.6 | 17.5 | 512 | 16 | 47.3 |
| Example 20 | 74 | 2.9 | 9.1 | 17.1 | 641 | 24 | 49.1 |

TABLE 6

Comparison between Air Barrier Performance of Rubber Filled by Graphene Oxide and that of Rubber Filled by Carbon Black

| Sample | Air Barrier Performance/ $10^{-17}\,m^2\,s^{-1}\,Pa^{-1}$ |
|---|---|
| Contrast 7 | 4.52 |
| Example 15 | 2.43 |
| Contrast 8 | 3.17 |
| Example 16 | 2.01 |
| Contrast 9 | 3.89 |
| Example 17 | 2.14 |
| Contrast 10 | 1.38 |
| Example 18 | 0.47 |
| Contrast 11 | 1.47 |
| Example 19 | 0.51 |
| Contrast 12 | 2.64 |
| Example 20 | 1.03 |

Contrast 13

Adding 250 g polyurethane emulsion (the solid content is 40 wt %) to a spray drier and performing spray drying. The drying medium is hot air having a temperature of 200° C. Collecting the product after drying to obtain polyurethane powder.

Moulding the polyurethane powder to obtain a polyurethane rubber vulcanizate. Properties of the polyurethane rubber vulcanizate are tested according to the national standards. Data of mechanical properties of the polyurethane rubber vulcanizate are shown in Table 7.

Example 21

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 100 g of the graphene oxide/water sol with 250 g polyurethane emulsion (the solid content is 55 wt %) for 20 min at a stirring speed of 800 r/min. Transferring the compounding emulsion of graphene oxide/polyurethane emulsion into a spray drier, and performing spray drying. The drying medium is hot air having a temperature of 200° C. Collecting the product after drying to obtain a graphene oxide/polyurethane nanocomposite in which graphene oxide is 0.1 phr.

Moulding the graphene oxide/polyurethane nanocomposite to obtain a graphene oxide/polyurethane vulcanizate. Properties of the vulcanizate are tested according to the national standards. Data of mechanical properties of the vulcanizate are shown in Table 7.

Example 22

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 1000 g of the graphene oxide/water sol with 250 g polyurethane emulsion (the solid content is 55 wt %) for 20 min at a stirring speed of 800 r/min. Transferring the compounding emulsion of graphene oxide/polyurethane emulsion into a spray drier, and performing spray drying. The drying medium is hot air having a temperature of 200° C. Collecting the product after drying to obtain a graphene oxide/polyurethane nanocomposite in which graphene oxide is 1 phr.

Moulding the graphene oxide/polyurethane nanocomposite to obtain a graphene oxide/polyurethane vulcanizate. Properties of the vulcanizate are tested according to the national standards. Data of mechanical properties of the vulcanizate are shown in Table 7.

Example 23

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 5000 g of the graphene oxide/water sol with 250 g polyurethane emulsion (the solid content is 55 wt %) for 20 min at a stirring speed of 800 r/min. Transferring the compounding emulsion of graphene oxide/polyurethane emulsion into a spray drier, and performing spray drying. The drying medium is hot air having a temperature of 200° C. Collecting the product after drying to obtain a graphene oxide/polyurethane nanocomposite in which graphene oxide is 5 phr.

Moulding the graphene oxide/polyurethane nanocomposite to obtain a graphene oxide/polyurethane vulcanizate. Properties of the vulcanizate are tested according to the national standards. Data of mechanical properties of the vulcanizate are shown in Table 7.

Example 24

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 10000 g of the graphene oxide/water sol with 250 g polyurethane emulsion (the solid content is 55 wt %) for 20 min at a stirring speed of 800 r/min. Transferring the compounding emulsion of graphene oxide/polyurethane emulsion into a spray drier, and performing spray drying. The drying medium is hot air having a temperature of 200° C. Collecting the product after drying to obtain a graphene oxide/polyurethane nanocomposite in which graphene oxide is 10 phr.

Moulding the graphene oxide/polyurethane nanocomposite to obtain a graphene oxide/polyurethane vulcanizate. Properties of the vulcanizate are tested according to the national standards. Data of mechanical properties of the vulcanizate are shown in Table 7.

Example 25

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 20000 g of the graphene oxide/water sol with 250 g polyurethane emulsion (the solid content is 55 wt %) for 20 min at a stirring speed of 800 r/min. Transferring the compounding emulsion of graphene oxide/polyurethane emulsion into a spray drier, and performing spray drying. The drying medium is hot air having a temperature of 200° C. Collecting the product after drying to obtain a graphene oxide/polyurethane nanocomposite in which graphene oxide is 20 phr.

Moulding the graphene oxide/polyurethane nanocomposite to obtain a graphene oxide/polyurethane vulcanizate. Properties of the vulcanizate are tested according to the national standards. Data of mechanical properties of the vulcanizate are shown in Table 7.

Example 26

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 40000 g of the graphene oxide/water sol with 250 g polyurethane emulsion (the solid content is 55 wt %) for 20 min at a stirring speed of 800 r/min. Transferring the compounding emulsion of graphene oxide/polyurethane emulsion into a spray drier, and performing spray drying. The drying medium is hot air having a temperature of 200° C. Collecting the product after drying to obtain a graphene oxide/polyurethane nanocomposite in which graphene oxide is 40 phr.

Moulding the graphene oxide/polyurethane nanocomposite to obtain a graphene oxide/polyurethane vulcanizate. Properties of the vulcanizate are tested according to the national standards. Data of mechanical properties of the vulcanizate are shown in Table 7.

TABLE 7

Mechanical Properties of Graphene Oxide/Polyurethane Vulcanizate Made by Emulsion Compounding with Spray Drying Process

| Sample | Shore Scleroscope Hardness in D scale | Tensile Strength/ MPa | Elongation at Break/ % | Tensile Strength at 100% Elongation/ MPa |
|---|---|---|---|---|
| Contrast 13 | 74 | 27.1 | 156 | 25.9 |
| Example 21 | 78 | 23.5 | 65 | — |
| Example 22 | 80 | 26.3 | 61 | — |
| Example 23 | 82 | 26.7 | 64 | — |
| Example 24 | 87 | 26.5 | 56 | — |
| Example 25 | 90 | 27.1 | 45 | — |
| Example 26 | 92 | 27.6 | 44 | — |

Example 27

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 5000 g of the graphene oxide/water sol with 167 g silicone rubber latex (the solid content is 60 wt %) for 30 min at a stirring speed of 800 r/min. Transferring the compounding emulsion of graphene oxide/silicone rubber latex into a spray drier, and performing spray drying. The drying medium is hot air having a temperature of 60° C., and the carrier gas contains 1% by flow ratio of HCl gas. Collecting the product after drying to obtain a graphene oxide/silicone rubber nanocomposite in which graphene oxide is 5 phr.

Moulding the graphene oxide/silicone rubber nanocomposite to obtain a graphene oxide/silicone rubber vulcanizate, mixing according to a formulation (2 parts by weight of DCP) to obtain a mix gel. Vulcanizing the mix gel at 170° C. during the optimum cure, and further vulcanizing in an oven for 2 h at 200° C. to obtain a graphene oxide/silicone rubber vulcanizate. Properties of the vulcanizate are tested according to national standards. Data of mechanical properties of the vulcanizate are shown in Table 8.

Example 28

Adding 10 g graphite oxide to 10 L water, treating by ultrasonic waves for 2 h at a power of 800 W, at a frequency of 1000 Hz, and at a temperature of 25° C. to obtain a graphene oxide/water sol having a solid content of 0.1 wt %. Mixing 5000 g of the graphene oxide/water sol with 200 g fluorine rubber latex (the solid content is 50 wt %) for 30 min at a stirring speed of 800 r/min. Transferring the compounding emulsion of graphene oxide/silicone rubber latex into a spray drier, and performing spray drying. The drying medium is hot air having a temperature of 300° C., and the carrier gas contains 1% by flow ratio of HCl gas. Collecting the product after drying to obtain a graphene oxide/fluorine rubber nanocomposite in which graphene oxide is 5 phr.

Moulding the graphene oxide/fluorine rubber nanocomposite to obtain a graphene oxide/fluorine rubber vulcanizate, mixing according to a formulation (2 parts by weight of DCP) to obtain a mix gel. Vulcanizing the mix gel at 150° C. during the optimum cure, and further vulcanizing in an oven for 24 h at 204° C. to obtain a graphene oxide/fluorine rubber vulcanizate. Properties of the vulcanizate are tested according to national standards. Data of mechanical properties of the vulcanizate are shown in Table 8.

TABLE 8

Mechanical Properties of Graphene Oxide/Rubber Vulcanizate Made by
Emulsion Compounding with Spray Drying Process

| Sample | Shore Sclerscope Hardness in A scale | Tensile Strength at 100% Elongation/ MPa | Tensile Strength at 300% Elongation/ MPa | Tensile Strength/ MPa | Elongation at Break/% | Tension Set/% | Tearing Strength/ kN/m |
|---|---|---|---|---|---|---|---|
| Example 27 | 65 | 5.7 | 9.8 | 16.2 | 458 | 12 | 46.4 |
| Example 28 | 72 | 6.9 | 10.5 | 18.9 | 420 | 8 | 51.3 |

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparing a delaminated graphene oxide/rubber nanocomposite, the method comprising:
    (1) preparing a graphene oxide/water sol comprising dispersing graphene oxide in deionized water, and treating by ultrasonic waves at a power of 10-2000 W, and at a frequency of 10-20000 Hz, for 10 min-6 h at a temperature of 0-100° C., to obtain the graphene oxide/water sol;
    (2) pretreating the graphene oxide/water sol comprising adding a surfactant to the graphene oxide/water sol, treating by ultrasonic waves for 5 min-5 h or stirring for 5 min-5 h at a stirring speed of 50-10000 r/min to obtain a pretreated graphene oxide/water dispersion;
    (3) preparing a graphene oxide/rubber compounding emulsion comprising treating the graphene oxide/water sol or the graphene oxide/water dispersion in addition to a rubber latex by ultrasonic waves for 10 min-6 h, or stirring the graphene oxide/water sol or the graphene oxide/water dispersion in addition to the rubber latex for 10 min-6 h at a stirring speed of 50-10000 r/min, to obtain a stabilized graphene oxide/rubber compounding emulsion;
    (4) preparing the graphene oxide/rubber nanocomposite comprising selecting one of the following processes to prepare the graphene oxide/rubber nanocomposite:
        A) ion flocculation process comprising adding a flocculant which demulsifies the graphene oxide/rubber compounding emulsion to perform flocculation, dehydrating and drying a flocculate of the flocculation to obtain the graphene oxide/rubber nanocomposite; and
        B) spray drying process comprising passing the graphene oxide/rubber compounding emulsion through a spray drier to produce small composite liquid drops, and dehydrating the composite liquid drops in a drying medium to obtain the graphene oxide/rubber nanocomposite; or adding a gasified flocculant to the drying medium of the spray drier to simultaneously perform flocculation and dehydration to obtain the graphene oxide/rubber nanocomposite.

2. The method of claim 1, wherein a solid content of graphene oxide in the graphene oxide/water sol is 0.01-20 wt %.

3. The method of claim 1, wherein the surfactant is selected from the group consisting of carboxylic styrene butadiene latex, butadiene-vinylpyridine copylymer latex, carboxylated styrene-butadiene latex, epoxy latex, carboxylic chloroprene rubber latex, carboxylic acrylonitrile styrene butadien rubber latex, and carboxyl polybutadiene, amino-propyl-tri-ethoxy silane coupling agent KH550, γ-(methacryloxypropyl)-tri-methoxy silane coupling agent KH570, and quaternary ammonium salt which have a solid content of 10-80 wt %; the surfactant is 0.01 phr-100 phr by weight, and phr denotes the weight parts of the surfactant per every hundred weight parts of rubber.

4. The method of claim 1, wherein the rubber latex is selected from the group consisting of styrene butadiene latex, natural latex, neoprene latex, butyl latex, NBR latex, butadiene latex, ethylene propylene rubber latex, polyisoprene rubber latex, fluorine rubber latex, silica rubber latex, and polyurethane rubber latex which have a solid content of 10-80 wt %.

5. The method of claim 1, wherein the flocculant is selected from the group consisting of sulphuric acid, hydrochloric acid, calcium chloride, sodium chloride, potassium chloride, sodium sulphate, aluminium sulphate, ferric trichloride, poly aluminium chloride, and poly ferric chloride which have a weight percentage of 0.1-10 wt %.

6. The method of claim 1, wherein the flocculate is dried at a temperature of ≤300° C.

7. The method of claim 1, wherein the drying medium in the spray drier is hot air having a temperature of 60-300° C.

* * * * *